US008270445B2

(12) United States Patent
Morasse et al.

(10) Patent No.: US 8,270,445 B2
(45) Date of Patent: *Sep. 18, 2012

(54) LIGHT EMITTING DEVICES WITH PHOSPHOSILICATE GLASS

(75) Inventors: Bertrand Morasse, Quebec (CA); Jean-Philippe De Sandro, Quebec (CA); Eric Gagnon, Stoneham (CA); Stephane Chatigny, Saint-Redempteur (CA)

(73) Assignee: Coractive High-Tech Inc, Quebec, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/669,440

(22) PCT Filed: Jul. 15, 2008

(86) PCT No.: PCT/CA2008/001296
§ 371 (c)(1),
(2), (4) Date: Jan. 15, 2010

(87) PCT Pub. No.: WO2009/009888
PCT Pub. Date: Jan. 22, 2009

(65) Prior Publication Data
US 2010/0202481 A1     Aug. 12, 2010

Related U.S. Application Data

(60) Provisional application No. 60/929,864, filed on Jul. 16, 2007.

(51) Int. Cl.
*H01S 3/17* (2006.01)

(52) U.S. Cl. ................ 372/40; 372/6; 385/142

(58) Field of Classification Search .......... 372/40, 372/6
See application file for complete search history.

(56) References Cited

U.S. PATENT DOCUMENTS

| 3,808,549 A | 4/1974 | Maurer |
| 4,033,667 A | 7/1977 | Fleming, Jr. |
| 4,815,079 A | 3/1989 | Snitzer et al. |

(Continued)

FOREIGN PATENT DOCUMENTS

CN        1400957 A       3/2003

(Continued)

OTHER PUBLICATIONS

Broer, M. et al. "Highly nonlinear near-resonant photdarkening in a thulium-doped aluminosilicate glass fiber", Optics Letter, vol. 18, No. 10, May 15, 1993, pp. 799-801.

(Continued)

*Primary Examiner* — Patrick Stafford
*Assistant Examiner* — Xinning Niu
(74) *Attorney, Agent, or Firm* — Merchant & Gould P.C.

(57) ABSTRACT

A light-emitting device is provided which includes a gain medium having an optically-active phosphosilicate glass, wherein the phosphosilicate glass includes at least one active ion dopant and from about 1 to 30 mol % of phosphorus oxide. The phosphorous oxide may be present in an effective amount for reducing any photodarkening effect and increasing the saturation energy of the system. The active ion dopant may be a rare earth dopant. The light-emitting device may include an optical waveguide, the optical waveguide including the gain medium. The optical waveguide may have a core and at least one cladding, and the gain medium having the phosphosilicate glass may be found in the core and/or in one of the cladding.

31 Claims, 12 Drawing Sheets

U.S. PATENT DOCUMENTS

| | | | |
|---|---|---|---|
| 4,852,117 | A * | 7/1989 | Po .................................. 372/97 |
| 5,173,456 | A | 12/1992 | Hayden et al. |
| 5,408,569 | A | 4/1995 | Nishimoto |
| 5,771,251 | A * | 6/1998 | Kringlebotn et al. ............ 372/6 |
| 5,818,630 | A | 10/1998 | Fermann et al. |
| 6,154,598 | A | 11/2000 | Gavrilovic et al. |
| 6,321,016 | B1 * | 11/2001 | Tirloni et al. ................. 385/127 |
| 6,495,482 | B1 | 12/2002 | de Sandro et al. |
| 6,625,180 | B2 | 9/2003 | Bufetov et al. |
| 6,636,347 | B1 | 10/2003 | Wang |
| 6,738,186 | B2 | 5/2004 | Jiang et al. |
| 6,941,053 | B2 | 9/2005 | Lauzon et al. |
| 7,046,902 | B2 | 5/2006 | de Sandro et al. |
| 7,062,137 | B2 | 6/2006 | Farroni et al. |
| 7,068,900 | B2 | 6/2006 | Croteau et al. |
| 7,423,803 | B1 * | 9/2008 | Chavez-Pirson et al. ......... 372/6 |
| 2005/0088727 | A1 * | 4/2005 | Nakashima et al. ..... 359/341.41 |
| 2005/0225841 | A1 * | 10/2005 | Bragheri et al. .............. 359/334 |
| 2005/0254764 | A1 * | 11/2005 | Chatigny ..................... 385/123 |
| 2006/0187973 | A1 * | 8/2006 | Varnham et al. .................. 372/6 |
| 2007/0053400 | A1 * | 3/2007 | Sinha et al. ..................... 372/64 |
| 2009/0011233 | A1 | 1/2009 | Morasse et al. |
| 2009/0016387 | A1 | 1/2009 | Durkin et al. |

FOREIGN PATENT DOCUMENTS

| | | |
|---|---|---|
| EP | 0 617 301 B1 | 9/1994 |
| JP | 2004-260104 A | 9/2004 |
| WO | WO 02/38514 A1 | 5/2002 |

OTHER PUBLICATIONS

Broer, M. et al. "Ultraviolet-induced distributed-feedback gratings in $Ce^{3+}$-doped silica optical fibers", Optics Letters, vol. 16, No. 18, Sep. 15, 1991, pp. 1391-1393.

Behrens, E. et al. "Characteristics of laser-induced gratings in $Pr^{3+}$- and $Eu^{3+}$-doped silicate glasses", J. Opt. Soc. Am. B., vol. 7, No. 8, Aug. 1990, pp. 1437-1444.

Paschotta, R et al. "Lifetime quenching in Yb-doped fibers", Optics Communications, vol. 136, 1997, pp. 375-378.

Morasse, B. et al. "Low photodarkening single cladding ytterbium fibre amplifier", Proceedings of SPIE, vol. 6453, Feb. 2007, Fiber Lasers IV: Technology, Systems, and Applications, Harter, D. et al., Editors, 64530H.

Kitabayashi, T. "Population Inversion Factor Dependence of Photodarkening of Yb-doped Fibers and it Suppression by Highly Aluminum Doping", Optical Fiber Communication Conference 2006 and 2006 National Fiber Optic Engineers Conference, OFC 2006, Mar. 2006.

Izawa, T. et al. "Optical Fibers: Materials and Fabrication", KTK Scientific Publishers, Tokyo, 1987.

Koponen, J. et al. "Measuring photodarkening from single-mode ytterbium doped silica fibers", Optics Express, vol. 14, No. 24, Nov. 27, 2006, pp. 11539-11544.

Kirchhof, J. et al. "Dopant Interactions in High Power Laser Fibers", Proceedings of SPIE, vol. 5723, Optical Components and Materials II, edited by Jiang, S. et al., 2005, pp. 261-272.

Dianov, et al. "New generation of Raman fiber lasers, based on phosphosilicate fibers", Conference on Lasers and Electro-Optics Europe, Sep. 10-15, 2000.

Osanai, et al. "Effect of Dopants on Transmission Loss of Low-OH-Content Optical Fibres", Electronics Letters, vol. 12, No. 21, Oct. 14, 1976, pp. 549550.

Xiong, Z. et al. "10-W Raman Fiber Lasers at 1248 nm Using Phosphosilicate Fibers", Journal of Lightwave Technology, vol. 21, No. 10, Oct. 2003, pp. 2377-2381.

Broer, M. et al. "Studying Pump Light-Induced Darkening in Erbium-Doped Fiber Amplifiers with Optical Time Domain Reflectometry", IEEE Photonics Technology Letters, vol. 4, No. 11, Nov. 1992, pp. 1264-1266.

Vienne, G. et al. "Fabrication and Characterization of $Yb^{3+}$ :$Er^{3+}$ Phosphosilicate Fibers for Lasers", Journal of Lightwave Technology, vol. 16, No. 11, Nov. 1998, pp. 1990-2001.

Manek-Honninger, I. et al. "Photodarkening and photobleaching of an ytterbium-doped silica double-clad LMA fiber", Optics Express, vol. 15, No. 4, Feb. 19, 2007, pp. 1606-1611.

Renaud, C. et al. "Characteristics of Q-Switched Cladding-Pumped Ytterbium-Doped Fiber Lasers with Different High-Energy Fiber Designs", IEEE Journal of Quantum Electronics, vol. 37, No. 2, Feb. 2001, pp. 199-2001.

Vu, K. et al. "Adaptive pulse shape control in a diode-seeded nano-second fiber MOPA system", Optics Express, vol. 14, No. 23, Nov. 13, 2006, pp. 10996-11001.

Sintov, Y. et al. "Extractable energy from ytterbium-doped high-energy pulsed fiber amplifiers and lasers", J. Opt. Soc. Am. B., vol. 23, No. 2, Feb. 2006, pp. 218-230.

* cited by examiner

LIGHT EMITTING DEVICES WITH PHOSPHOSILICATE GLASS

CROSS-REFERENCE TO RELATED APPLICATION

This application is a National Stage Application of PCT/CA2008/001296, filed 15 Jul. 2008, which claims benefit of U.S. Ser. No. 60/929,864, filed 16 Jul. 2007 and which applications are incorporated herein by reference. To the extent appropriate, a claim of priority is made to each of the above disclosed applications.

This application contains subject matter which is related to the subject matter of commonly assigned US, Patent Application Publication No. US 2009-0011233 A1, publication date Jan. 8, 2009, which is incorporated herein by reference in its entirety

FIELD OF THE INVENTION

The present invention relates generally to optically active glass and light emitting devices including such glass. More specifically, the invention relates to phosphosilicate optical waveguides and high output power amplifiers or lasers including the same.

BACKGROUND OF THE INVENTION

Optical fiber lasers and amplifiers used in the amplification of light usually include optical fibers having optically active waveguiding cores doped with rare-earth active ions, such as for example, thulium, erbium, ytterbium and neodymium. Amplification is achieved by stimulated emission of photons from dopant ions in the doped optical fiber, and so the composition of the optical fiber affects the properties of the emitted amplified light. As such, the composition of the fibers is tailored to optimize the desired properties for a given application. However, it is also important that the optimized desired optical properties of the fiber remain stable over time.

In general, an optical fiber may be multi-mode or single-mode or few-moded like large mode area (LMA) fibers. A multi-mode or LMA fiber allows for more than one mode of the light wave, each mode travelling at a different phase velocity, to be confined to the core and guided along the fiber. A single-mode fiber supports only one transverse spatial mode at a frequency of interest. Given a sufficiently small core or a sufficiently small numerical aperture, it is possible to confine a single mode, the fundamental mode, to the core. Fundamental modes are preferred for many applications because higher beam quality and focusing properties are obtained, and the intensity distribution of the light wave emerging from the fiber is unchanged regardless of launch conditions and any disturbances of the fiber.

A real optical fiber attenuates the light travelling through it, it is therefore advantageous to keep the fiber length as short as possible. It is important to maximize the energy stored in the gain medium. The saturation energy of a gain medium is the energy required to achieve significant saturation of the gain medium. It is also important to maximize the energy extracted from the stored energy. The main limitations for achieving high peak powers inside optical fibers are due to small mode size and large propagation length, which can create non-linear effects. Another problem with some gain media having high-emission cross sections is that the saturation energy per unit area is low, which consequently limits the amount of energy that may be extracted and causes pulse deformation.

Longitudinal mode beating can be an important source of high frequency noise which consequently gives rise to peak power fluctuations in the pulse structure of a pulsed amplifier or laser. Depending on its amplitude and frequency spectrum, this noise can severely limit the ability to generate stable optical pulses having special shapes with fine structures.

Another problem encountered with high-energy amplifiers and lasers are the non-linear effects that appear at high energies. The onset of non-linear effects can severely degrade the spectral content and limit the power output of the laser source.

For some rare-earth doped core compositions, photodarkening (i.e. the formation of photoinduced structural transformations) over time induces losses in the doped glass core of the fibers resulting in reduced output power efficiency of the fibers.

Photodarkening has already been observed in rare-earth-doped silica fibers: M. M. Broer et al. (Opt. Lett. 1993, 18 (10), p. 799-801) describe photodarkening in thulium-doped fibers, M. M. Broer et al. (Opt. Lett. 1991, 16 (18), p. 1391-1393) describe photodarkening in cerium-doped fibers, and E. G. Behrens et al. (1990, JOSA B 7 (8), p. 1437-1444) describe photodarkening in europium- and praseodymium-doped fibers. The first experimental evidence of this phenomenon in ytterbium doped silica fiber was described by R. Paschotta et al. in Opt. Commun., 1997, 136 (5-6), p. 375-378.

U.S. Pat. No. 5,173,456 describes phosphate glass useful in high-energy lasers. Specifically, a low- or no-silica, low- or no-alkali phosphate glass useful as a laser amplifier in a multiple pass, high energy laser system having a high thermal conductivity, low coefficient of thermal expansion, low emission cross section, and a high fluorescence lifetime is described.

There is therefore a need for high-energy lasers and amplifiers with enhanced power output, higher extraction and saturation energy, reduced non-linear effects, reduced need for pulse-shaping, higher beam quality and focusing properties, which are easily pumped and packaged, and which are stable over time.

SUMMARY OF THE INVENTION

Accordingly it is an object of the present invention to provide a light-emitting device including a phosphosilicate optically-active glass.

In accordance with one aspect of the invention, there is provided a light-emitting device which includes a gain medium that includes an optically-active phosphosilicate glass, wherein the phosphosilicate glass comprises at least one active ion dopant and from about 1 to 30 mol % of phosphorus oxide comprising at least one rare-earth active ion dopant, consisting of ytterbium, thulium, neodymium, an oxide thereof, or any combination thereof, said phosphosilicate glass further comprising from about 1 to 30 mol % of phosphorus oxide.

The at least one active ion dopant may induce a photodarkening effect in optical properties of the optically-active glass and the phosphorous oxide may be present in an effective amount for reducing the photodarkening effect.

The active ion dopant may be a rare-earth dopant. The rare-earth dopant may include ytterbium, thulium, erbium, neodymium, an oxide thereof, or any combination thereof.

The light-emitting device may include an optical waveguide wherein the optical waveguide includes the gain medium.

The optical waveguide may have a core and at least one cladding surrounding the core. In accordance with an embodiment of the invention, the optical waveguide may be an optical fiber.

The core may have an outer region and an inner region, the outer region having a refractive index lower than a refractive index of the inner region.

In accordance with an embodiment of the invention, the gain medium includes the core of the waveguide. In accordance with another embodiment, the gain medium includes at least one of the cladding surrounding the core. In accordance with yet another embodiment, the gain medium includes the core and at least one of the cladding surrounding the core.

The optical waveguide may have two or more claddings surrounding the core. It may include a triple-clad pedestal-design optical fiber.

The light-emitting device may be a device that emits light or alternatively and additionally amplifies light. The light-emitting device may include an amplifier, wherein the amplifier includes the gain medium. The light-emitting device may include a laser, wherein the laser includes the gain medium.

In accordance with another aspect of the invention, there is provided an optical waveguide for use in a light-emitting device, the optical waveguide comprising a gain medium including an optically-active phosphosilicate glass, comprising at least one rare-earth active ion dopant, consisting of ytterbium, thulium, neodymium, and oxide thereof, or any combination thereof, said phosphosilicate glass further comprising from about 1 to 30 mol % of phosphorus oxide.

The optical waveguide may comprise a core and at least one cladding surrounding the core, and the gain medium may include the core or at least one of the cladding.

The objects, advantages and other features of the present invention will become more apparent and be better understood upon reading of the following non-restrictive description of the preferred embodiments of the invention, given with reference to the accompanying drawings. The accompanying drawings are given purely for illustrative purposes and should not in any way be interpreted as limiting the scope of the invention.

DESCRIPTION OF PREFERRED EMBODIMENTS OF THE INVENTION

The present invention will be described more fully hereinafter with reference to the accompanying drawings, FIGS. 1A to 9C, in which like numerals refer to like elements throughout.

In the following description, the term "light" is used to refer to all electromagnetic radiation, including but not limited to visible light. Furthermore, the term "optical" is used to qualify all electromagnetic radiation, that is to say light in the visible spectrum and light in other wavelength ($\lambda$) ranges.

According to one aspect, the invention provides a light-emitting device which includes a gain medium that includes an optically active phosphosilicate glass, the phosphosilicate glass having at least one active ion dopant and from about 1 to 30 mol % of phosphorus oxide.

The light-emitting device may emit light and alternatively or additionally it may amplify light. Although the light-emitting device is preferably embodied by an amplifier or a pulsed amplifier, it may be embodied by a laser, a pulsed laser, an optical source of amplified spontaneously emitted (ASE) radiation, any continuous wave (CW) or quasi-continuous wave (quasi-CW) amplifier or laser, be it coherent or incoherent, or by any other means of amplification or generation (source) of light.

The term "laser" refers to the amplification of light by the stimulated emission of radiation. An optical amplifier is similar to a laser, but does not have feedback from an optical cavity.

For example, a laser amplifies light by the stimulated emission of radiation. It includes a gain medium inside an optically cavity and means to supply, or pump, energy to the gain medium. The gain medium is a material with appropriate optical properties. The optical cavity causes the light to pass back and forth through the gain medium. Energy is pumped into the gain medium. This energy excites atoms in the gain medium to transition to a higher energy level, creating a population inversion. When light of an appropriate wavelength passes through the gain medium, the photons stimulate the excited atoms to emit additional photons of the same wavelength and to decay down to a lower energy level, resulting in an amplification of the light. The excited atoms can also decay spontaneously through spontaneous emission of a photon of a different wavelength that the incident light, thus reducing the efficiency of the light amplification.

Figure 9A:
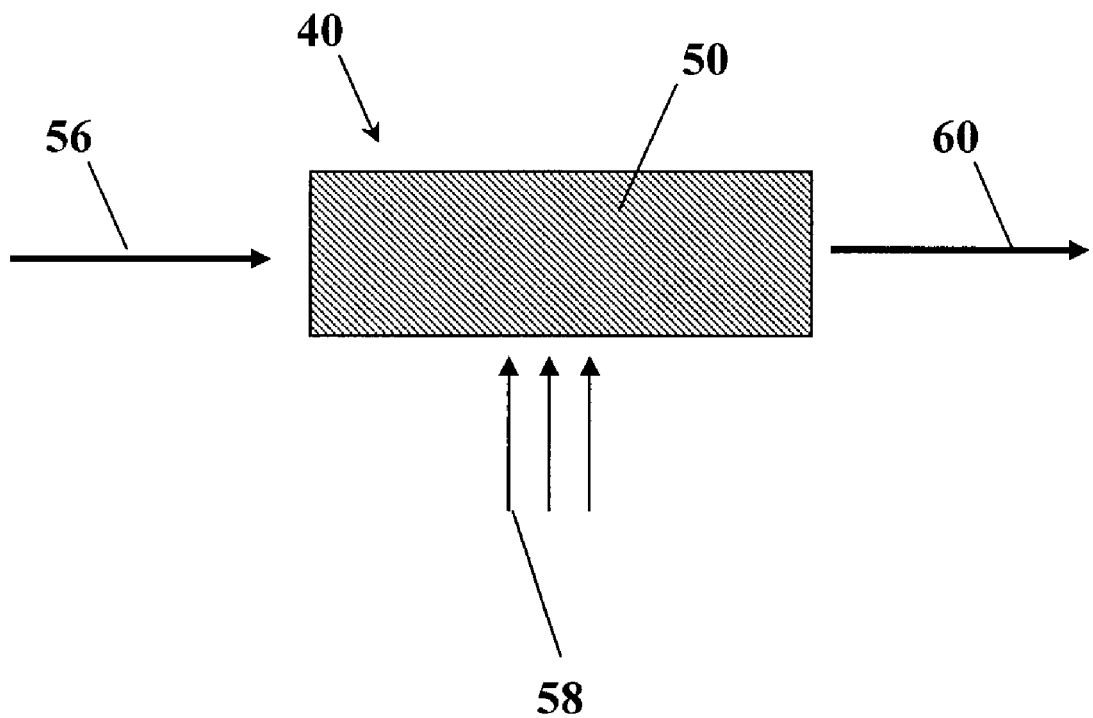
FIG. 9A is a diagram of a light-emitting device according to an embodiment of the invention.
Figure 9B:
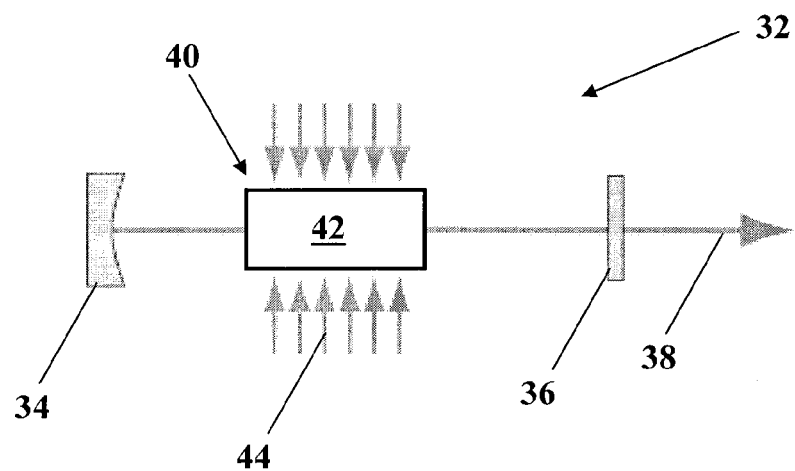
FIG. 9B is a diagram of a simple laser comprising a gain medium, according to an embodiment of the invention.
Figure 9C:
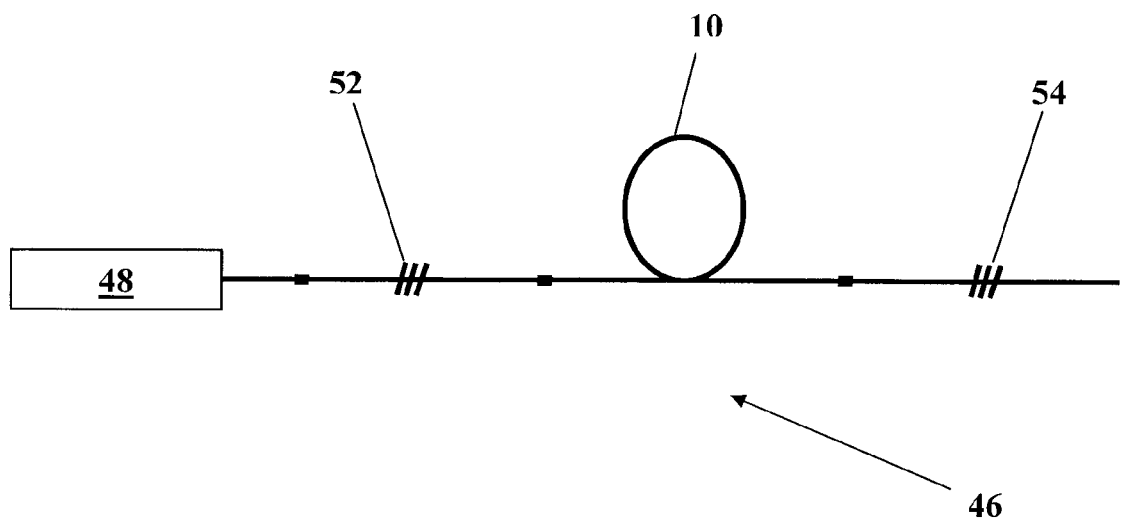
FIG. 9C is a diagram of a fiber laser with an optical fiber comprising the gain media, according to an embodiment of the invention.

The light-emitting device may include, for example, an amplifier, a laser, or an optical waveguide, wherein the amplifier, the laser, or the optical waveguide has a gain medium which includes the phosphosilicate glass. FIG. 9A illustrates a general light-emitting device 30 comprising a gain medium 40 that has an optically-active phosphosilicate glass 50. Light 56 enters the gain medium 40 comprising a phosphosilicate glass 50. The gain medium is pumped with light 58 and an output light signal 60 is emitted. FIG. 9B illustrates an example of a simple optically-pumped laser 32. The laser cavity i.e. resonator, consists of a highly reflective curved mirror 34 and a partially transmissive flat mirror 36 for extracting some of the circulating laser light and producing an output beam 38. The gain medium 40 with the optically-active phosphosilicate glass is a laser glass 42 which is side-pumped with pump light 44 of appropriate wavelength. FIG. 9C illustrates yet another optically-pumped laser 46. The laser 46 is pumped with light from multimode pump diodes 48. The light passes through a high reflectivity double cladding fiber Bragg grating 52 and into an optical fiber 10. Light is then outputted from the optical fiber 10 through a low-reflectivity double-cladding fiber Bragg grating 54. Here, it is the optical fiber 10 that contains the gain medium which has an optically-active phosphosilicate glass.

The term "optical waveguide" refers to a device that constrains or guides the propagation of electromagnetic radiation along a path defined by the guide.

Although the optical waveguide is preferably embodied by an optical fiber, and the invention is sometimes described herein according to such a preferred embodiment for the sake of simplicity, the optical waveguide may be embodied by any appropriate waveguide or microstructured optical fiber, be it a planar waveguide, birefringent waveguide such as a panda fiber, a photonics crystal fiber, a multi-core fiber, a polarization-maintaining fiber, an air cladding fiber, a single-cladding or multi-cladding fiber.

The optical waveguide may include a core and at least one cladding surrounding the core. The gain medium containing the optically-active phosphosilicate glass may be included in the core of the optical waveguide, in one of the cladding surrounding the core of the optical waveguide, or any combination thereof.

The optically-active phosphosilicate glass includes at least one active ion dopant. It is understood that the expression "optically active" in the sense of the invention refers to a material used to amplify or generate light. The active ion dopant may be a rare-earth ion dopant. The rare-earth dopant may include ytterbium, thulium, neodymium, erbium or any combination thereof, including oxides thereof. Preferably, the rare-earth ion is ytterbium. Of course, other active ions may also be used, such as for example titanium or chromium.

The optically active phosphosilicate glass emits light of a desired wavelength when pumped with light of a predetermined wavelength. For example, certain phosphosilicate double-cladding fiber lasers and amplifiers can be pumped between 910 nm to 980 nm to emit between 1060 nm to 1090 nm, and certain phosphosilicate single-cladding fibers can be pumped at 975 nm to emit at 1015 nm. (It should be understood that the indicated exemplary wavelength values in practice include a narrow wavelength band about the wavelength value: wavelength ±5%.)

The optically-active rare-earth-doped phosphosilicate glass may include from about 50 to 98 mol % of silica, from 0.01 to about 5 mol % of at least one rare-earth dopant, and from about 1 to 30 mol % of phosphorus oxide. Preferably, in particular for high energy application, the phosphorus oxide is present in an effective amount for reducing photodarkening. Optionally, the optically-active rare-earth-doped phosphosilicate glass may include from about 50 to 98 mol % of silica, and from 0.01 to about 5 mol % of $Yb_2O_3$.

The optically-active rare-earth-doped phosphosilicate glass may further include from 0.01 to about 30 mol % of at least one co-dopant. The co-dopant may be an oxide of Al, an oxide of La, an oxide of Lu, an oxide of P, an oxide of Ge, an oxide of Ti, an oxide of F, an oxide of B or any combination thereof.

Figure 7A:
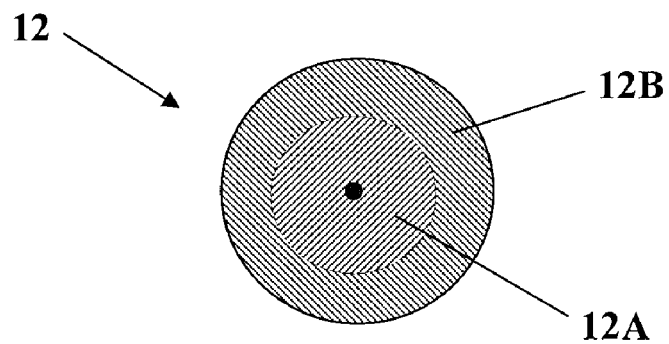
FIG. 7A is a cross-sectional view of a core of an optical waveguide according to an embodiment of the invention.
Figure 7B:
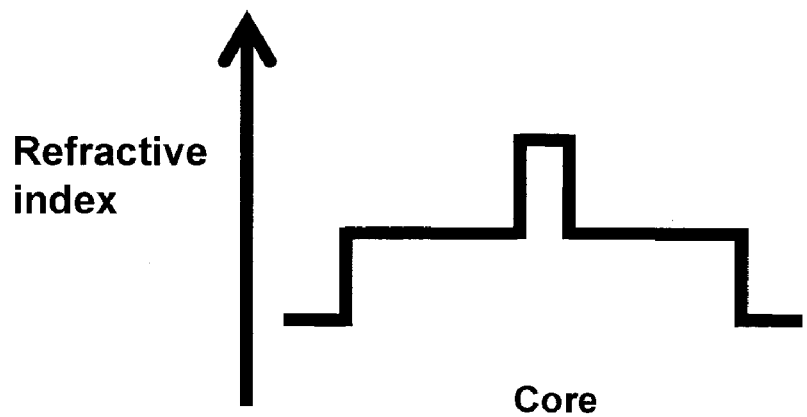
FIG. 7B is a diagram of the refractive index profile along the diameter of a core of an optical waveguide according to an embodiment of the invention, showing a stepped change in index of refraction.
Figure 7C:
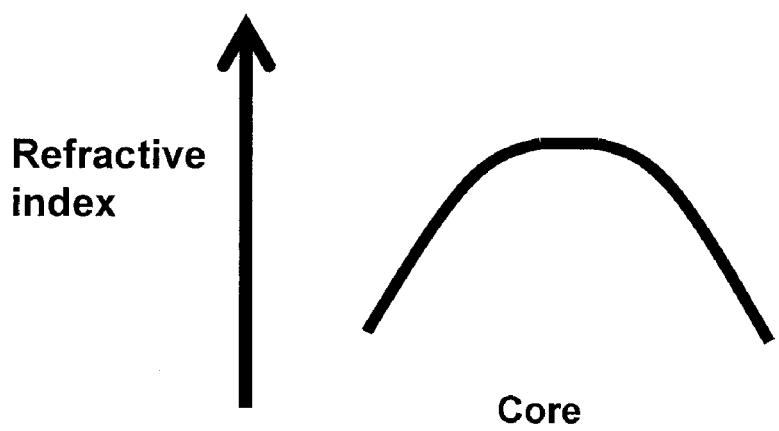
FIG. 7C is a diagram of the refractive index profile along the diameter of a core of an optical waveguide according to an embodiment of the invention, showing a gradual change in index of refraction.

Moreover, the core of the fiber need not be radially uniform. The outer region 12B of the core 12 may have a lower refractive index than the inner region 12A of the core as shown in FIG. 7A. The change in refractive index may be gradual or stepped, as shown in FIGS. 7B and 7C respectively. To reduce the refractive index of the outer core, the outer core may be doped with suitable outer core dopants, for example, Al, La, Lu, P, Ge, Ti, F, B, or oxides thereof, or combinations thereof. One or more sub-regions of the core may have no dopant at all and consist of pure silica.

Figure 3:
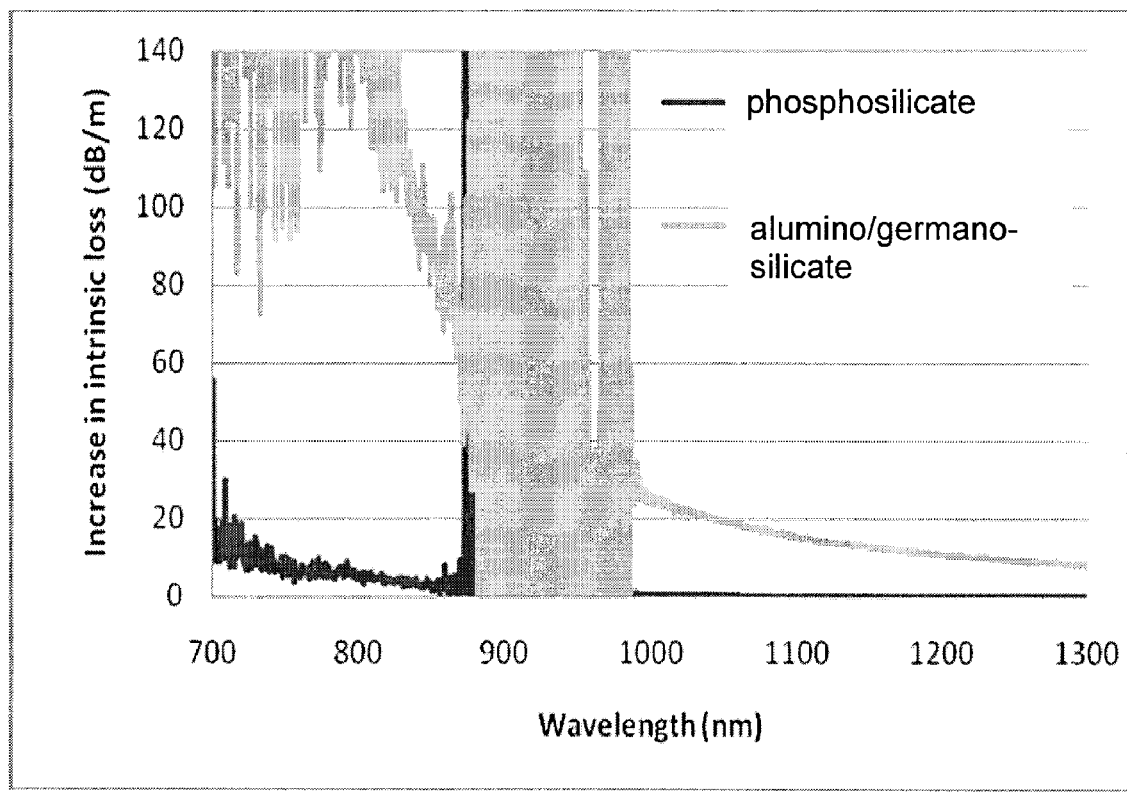
FIG. 3 is a graphical representation of the increase in intrinsic loss versus the wavelength of light, showing negligible loss due to photodarkening in an optical waveguide with an optically-active phosphosilicate glass core.

A preferred optically-active phosphosilicate glass according to the invention may include about 90 mol % of silica, about 1 mol % of $Yb_2O_3$, about 1 mol % of $Al_2O_3$, and about 8 mol % of phosphorus oxide. Such a composition will reduce adverse photodarkening effects that cause power degradation in amplifiers and lasers, as shown in FIG. 3.

Other optically-active phosphosilicate glass compositions are given in the related US Patent Application Publication No. US 2009-0011233 A1, publication date Jan. 8, 2009, which is incorporated herein by reference in its entirety.

Adding phosphorous to the fiber waveguide advantageously increases the refractive index contrast and improves the resistance to bendings of the fiber.

Figure 1A:
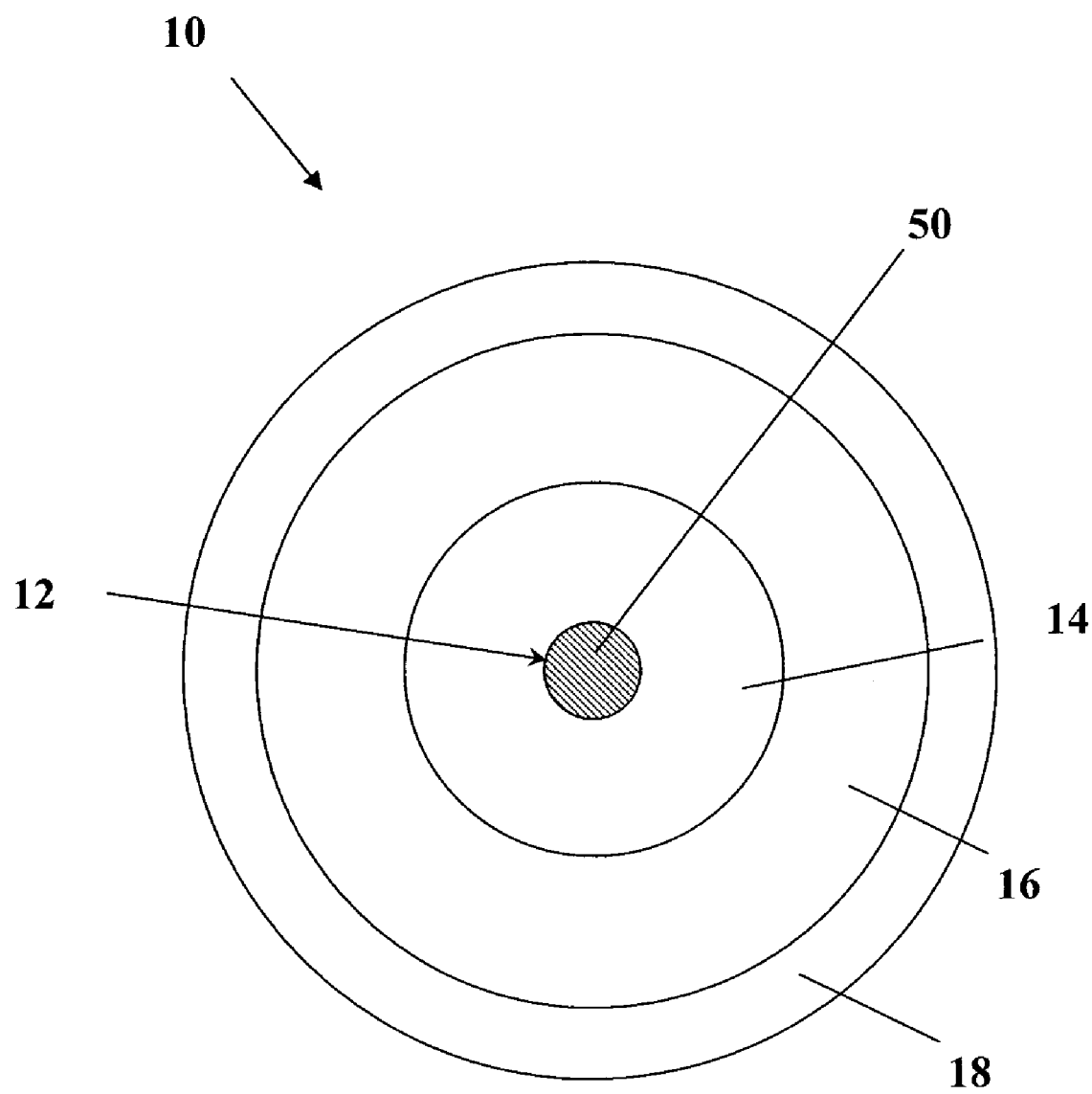
FIG. 1A is a cross-sectional view of an optical waveguide of a light-emitting device, according to an embodiment of the invention.

As mentioned earlier, according to an embodiment of the invention, a light emitting device having an optical waveguide that includes the gain medium containing the phosphosilicate glass may have a core and at least one cladding. Preferably, the cladding consists of pure silica. However, it may consist of any appropriate material, for example silica doped with fluorine oxide. Moreover, the cladding may be microstructured. Although the light-emitting device preferably includes a core with an optically-active phosphosilicate glass, it is to be understood that the cladding may also include an optically-active phosphosilicate glass. The phosphosilicate glass having at least one active ion dopant and from about 1 to 30 mol % of phosphorus oxide may be included in the core and/or in any of the cladding (see FIGS. 1A, 1B, and 1C). Moreover, the optically-active phosphosilicate glass found in the core may differ in composition from that found in the cladding. Moreover, the optical waveguide may include additional cladding. Preferably, the optical waveguide is a triple-clad optical fiber. The design of a triple-clad optical fiber is also known as a pedestal design. Double-clad and triple-clad designs are shown in FIGS. 1A, 1B, and 1C.

Figure 1B:
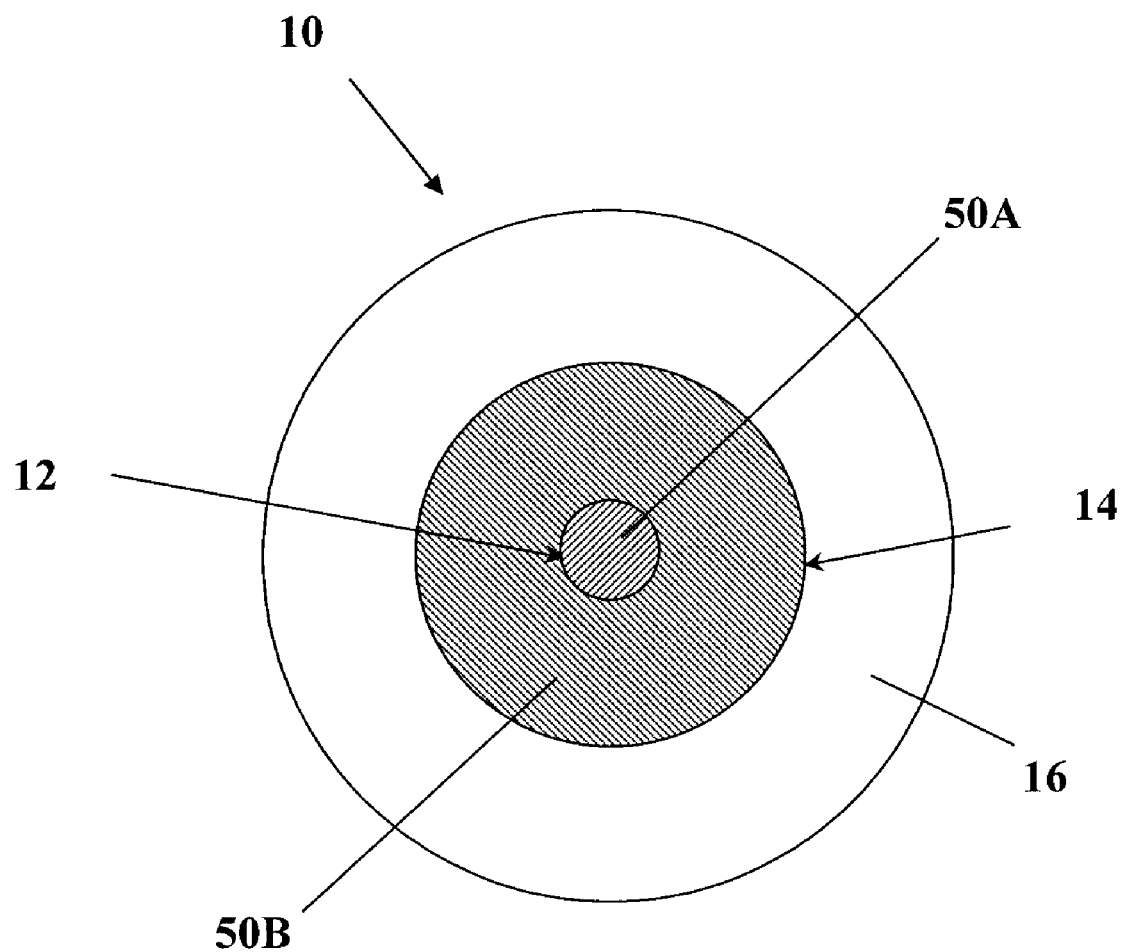
FIG. 1B is a cross-sectional view of an optical waveguide of a light-emitting device, according to another embodiment of the invention.
Figure 1C:
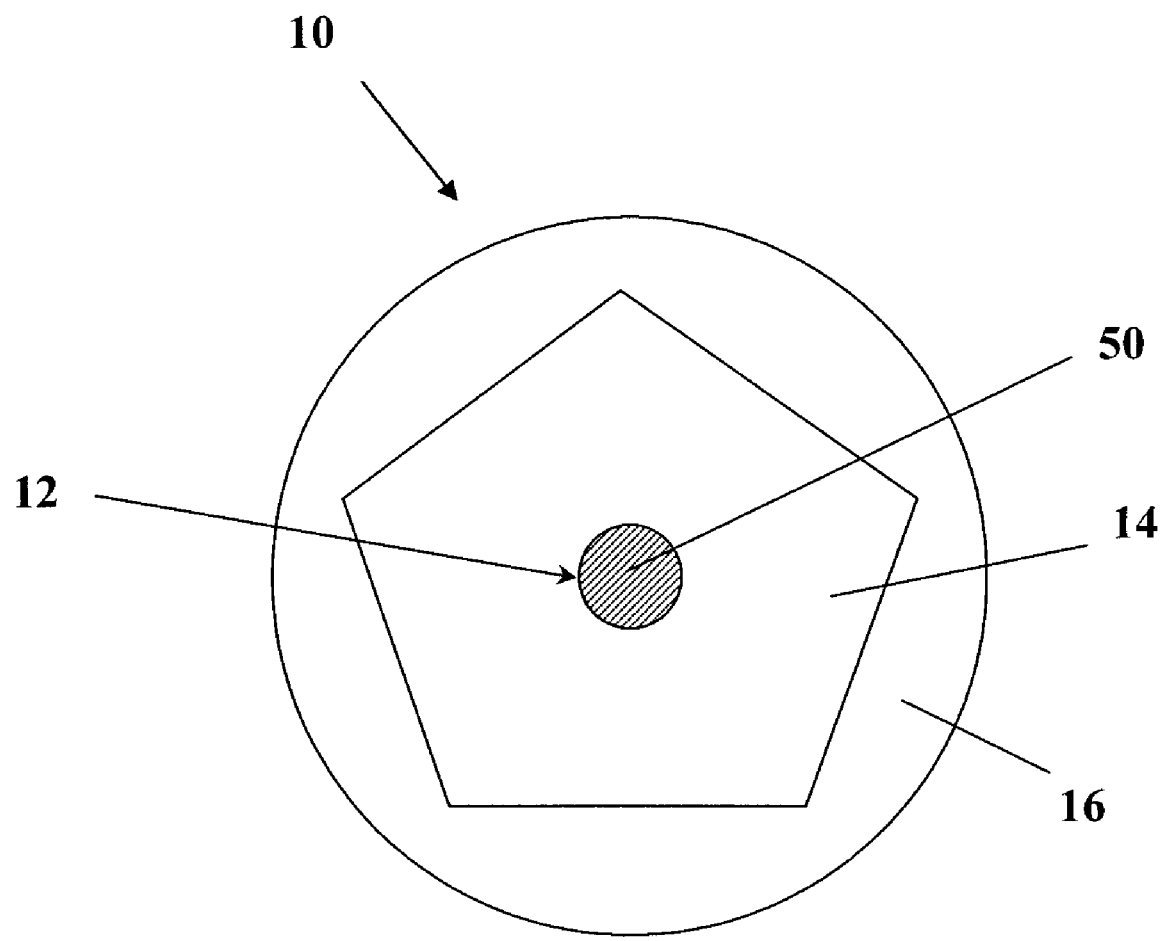
FIG. 1C is a cross-sectional view of an optical waveguide of a light-emitting device, according to an embodiment of the invention.

FIGS. 1B and 1C show examples of optical fibers according to preferred embodiments of the invention which have double cladding. As seen in these figures, an optical fiber 10 is provided with a waveguide core 12 which has an optically active phosphosilicate glass 50A. In this case, the core has a circular cross-section. The core extends centrally in the optical fiber 10. The core 12 is surrounded by an inner cladding 14 defining a pump guide for receiving pump energy and transferring pump energy to the core 12. The inner-cladding 14 shown in FIG. 1B has a circular cross-section whereas the inner-cladding shown FIG. 1C has a pentagonal cross-section. Moreover, the inner cladding 14 of fiber 10 in FIG. 1B is made of an optically-active phosphosilicate glass 50B. The double-clad optical fibers shown in FIGS. 1B and 1C are also provided with an outer cladding 16 surrounding the inner cladding 14. FIG. 1A shows an optical fiber according to an embodiment of the invention which has a core 12 containing the optically active phosphosilicate glass 50 and a triple cladding; it has a third cladding 18 surrounding claddings 14 and 16. Of course, a person of the art will understand that the core and the cladding may have any appropriate cross-section geometry, e.g. including hexagonal, octagonal, etc. and are not to be considered limited to the geometries illustrated.

Figure 6:
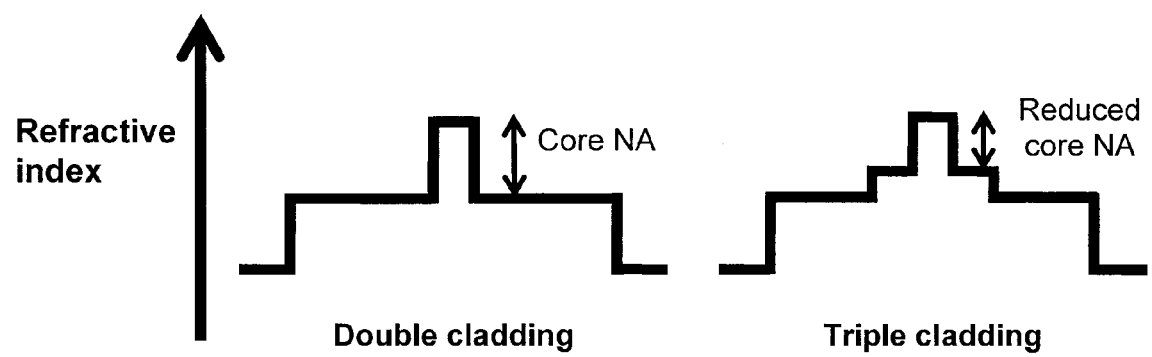
FIG. 6 is a diagram of the refractive index profile along the diameter of a double-cladding optical waveguide and along the diameter of a triple-cladding optical waveguide according to embodiments of the invention, showing a reduced core numerical aperture for a triple-cladding optical waveguide.

As illustrated in FIG. 6 which shows the refractive index profile along the diameter of a double-cladding and triple-cladding optical fiber, the triple-clad design allows for a lower numerical aperture of the core, which in turn implies increased mode area of the modes propagating in the waveguide and therefore decreased non-linear effects, reduced number of modes and therefore improved beam quality, and reduced amplified spontaneous emission (ASE) and therefore enhanced efficiency. An improved beam quality is well known to have a lower $M^2$, lower BPP parameter, more Gaussian-like pulse shape, and better focusing properties. Another advantage of the triple-clad design is the higher resistance to bending loss obtainable if required using an appropriate diameter of the triple cladding.

The phosphosilicate-based optical waveguide described above exhibits many useful advantages over conventional optical fibers and is therefore well-suited for use in amplifiers and lasers, especially pulsed amplifiers and lasers. The phosphosilicate-based optical waveguide allows for an increase in the saturation energy as well as the extraction energy of pulsed amplifiers and lasers.

Figure 2:
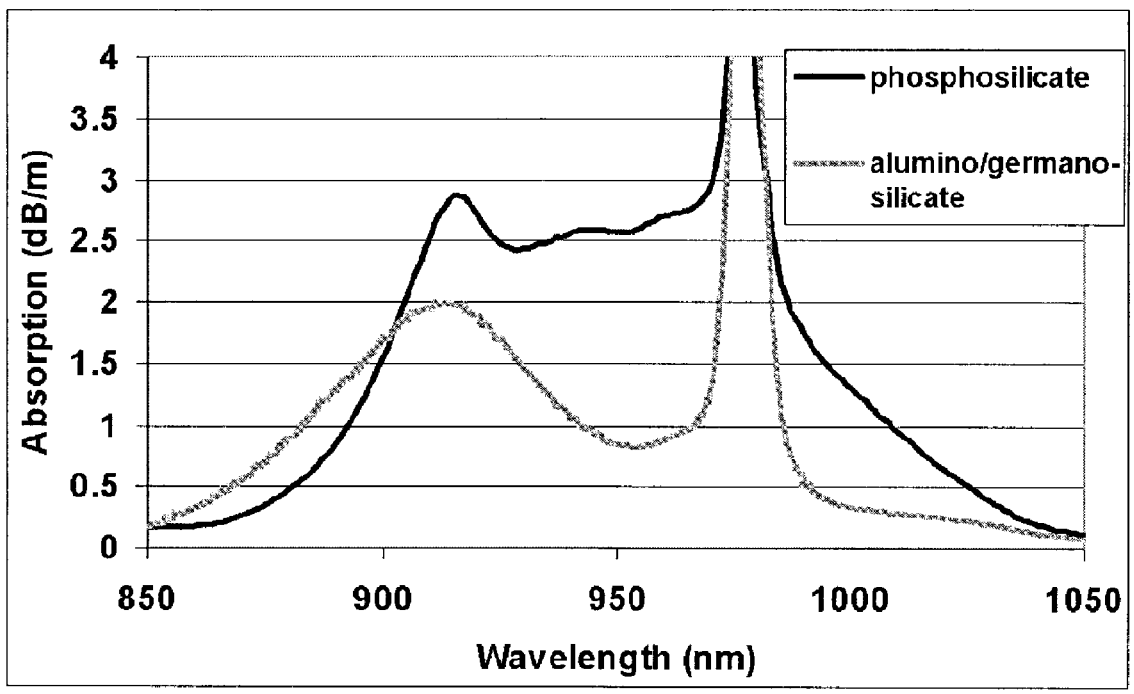
FIG. 2 is a graphical representation of the absorption versus wavelength of the pump energy showing a flat absorption in the 910 nm to 970 nm range for phosphosilicate-based optical waveguides.

FIG. 2 shows the flat and increased absorption achieved with this waveguide in the 910 nm to 970 nm range. This means that no pump tuning is necessary and that the pumping in the 910 nm to 970 nm range, which overlaps with the absorption spectrum of ytterbium, is more efficient. A higher absorption allows for a smaller fiber length and reduces non-linear effects. As shown in Table 1, a phosphosilicate-based optical waveguide exhibits a saturation energy ($E_{sat}$) of up to three times higher than that of a standard fiber at 1064 nm owing to the smaller emission cross-section ($\sigma_{es}$) and absorption cross-section ($\sigma_{as}$). The values are derived from Equation 1, where h is the Planck constant, ν is the corresponding frequency of the light of wavelength λ, A is the core area, and Γ is the overlap between the core and the propagating mode.

$$E_{sat} = \frac{h\nu A}{(\sigma_{es} + \sigma_{as}) \cdot \Gamma}$$ Equation 1

TABLE 1

| Core diameter (μm) | Saturation energy Standard Ge—Al fiber (mJ) | Saturation energy P fiber (mJ) |
| --- | --- | --- |
| 10 | 0.05 | 0.17 |
| 15 | 0.10 | 0.37 |
| 20 | 0.18 | 0.66 |
| 25 | 0.29 | 1.02 |

Figure 4:
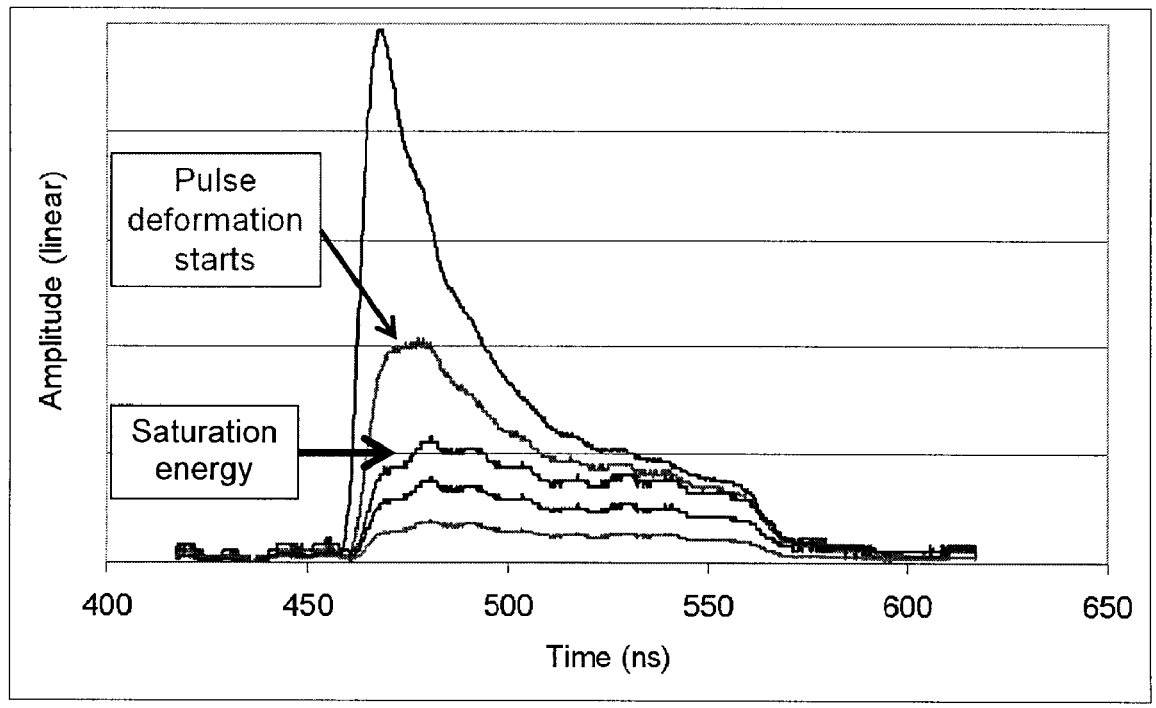
FIG. 4 is a graph of the amplitude of a generated pulse over time, showing no need for pulse-shaping at the saturation energy and increase pulse deformation past the saturation energy.

FIG. 4 shows the problem of pulse deformation with increased output energy. The phosphosilicate-based optical waveguide decreases pulse deformation thereby facilitating or reducing the need for pulse shaping. Moreover, since the saturation energy for phosphosilicate-based optical waveguides is greater, higher extraction energy, which can be approximately 10 times the saturation energy, is possible in amplifiers and lasers using the phosphosilicate-based optical waveguide. Thus, higher energy extraction is achieved, which also allows the use of a smaller core if so desired.

Figure 5A:
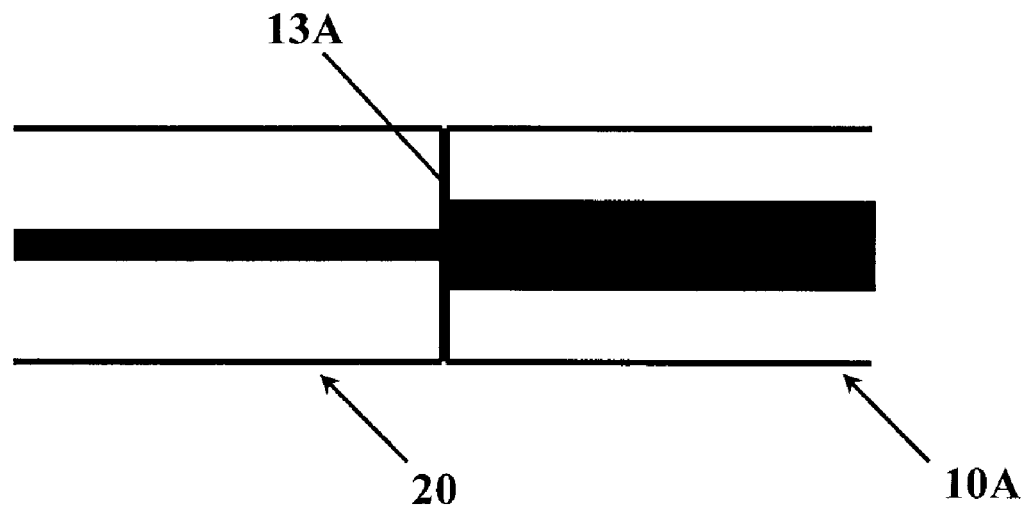
FIG. 5A is a diagram showing the theoretical loss upon splicing of a relay fiber to an optical waveguide.
Figure 5B:
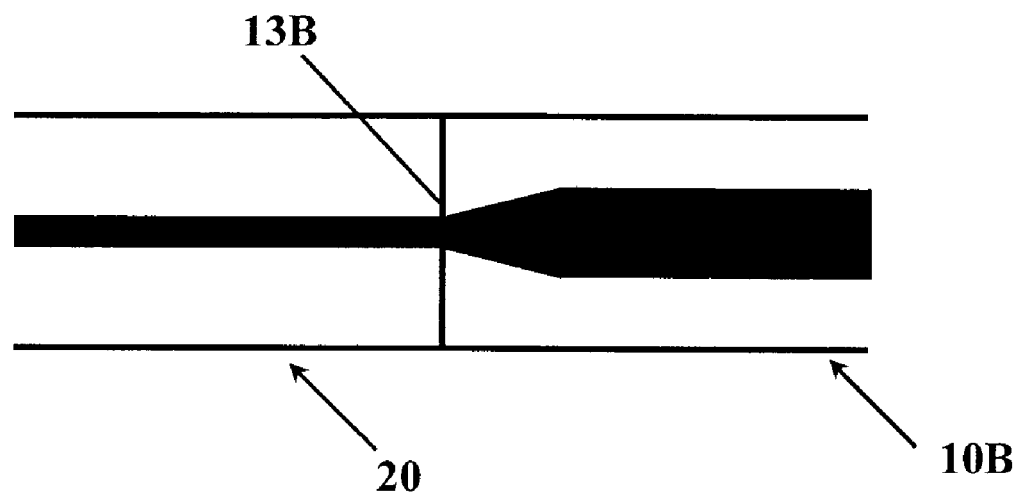
FIG. 5B is a diagram showing the measured loss upon slicing of a relay fiber to an optical waveguide according to the invention.

FIGS. 5A and 5B show the improved splicing of a tapered phosphosilicate-based optical waveguide of the present invention to an undoped passive relay fiber. The improved tapering and dopant diffusion of the phosphosilicate-based optical waveguide of the present invention can yield a measured splice loss of the tapered phosphosilicate-based optical waveguide 10B that is one quarter that of the theoretical splice loss of a fiber that is not tapered to match the relay fiber (e.g. fiber 10A) and does not have equivalent diffusion properties. The improved dopant diffusion is caused for instance by the high vapour pressure of phosphorous. The example shown in FIGS. 5A and 5B is that of a 5-μm single-mode-at-1060-nm fiber relay 20 being spliced to a 15-μm phosphosilicate-based optical waveguide 10A and 10B. In this example, the splice loss for the non-tapered splice 13A is calculated from theory to be 1.6 db whereas the splice loss for the tapered splice 13B is measured to be 0.35 db. Single mode excitation is possible.

Figure 8:
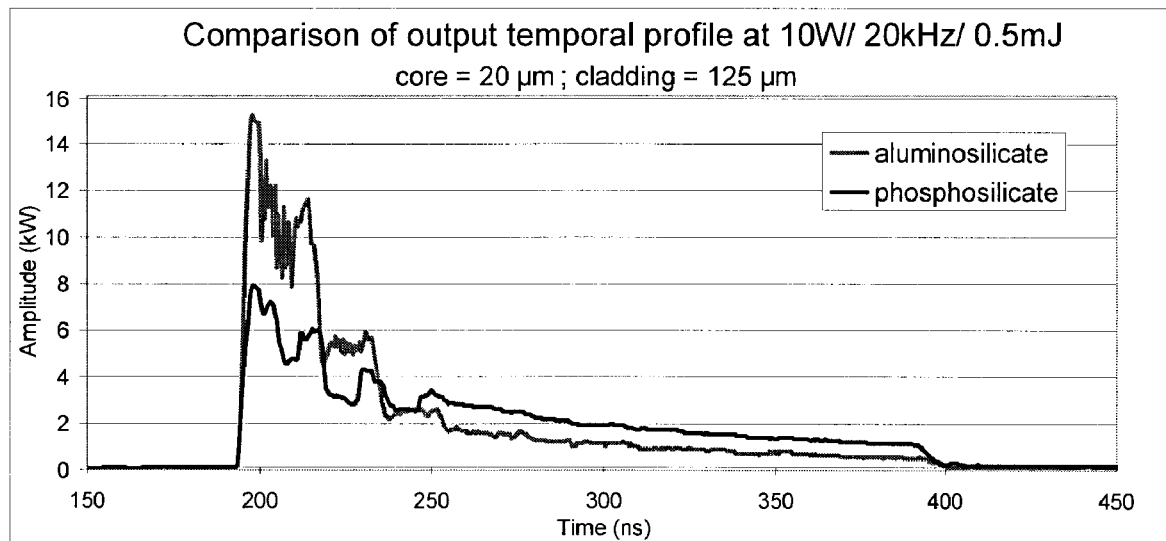
FIG. 8 is a graph of the amplitude of a rectangular pulse over time showing the output pulse suffers from less deformation and stays more rectangular in an optical waveguide comprising an optically-active phosphosilicate glass gain medium.

FIG. 8 is a graph of the amplitude of a rectangular pulse over time. As is evident from the graph, starting from a rectangular pulse, the output pulse suffers from less deformation and stays more rectangular in an optical waveguide, for example a fiber, comprising an optically-active phosphosilicate glass gain medium.

Advantageously, the phosphosilicate-based optical waveguide may also have superior mechanical, thermal, and optical properties, such as high strength, high melting point, and low attenuation, as compared to, for instance, phosphate-based glass. In preferred embodiments, it also matches well and splices easily to silica-based glass.

Light-emitting devices according to embodiments of the invention, for example high-energy lasers and amplifiers which use phosphosilicate optically-active glass, exhibit enhanced power output, higher extraction and saturation energy, reduced photodarkening effects, reduced non-linear effects, reduced need for pulse-shaping, higher beam quality and focusing properties, are easily pumped and packaged, and are stable over time.

Numerous modifications could be made to any of the embodiments described above without departing from the scope of the present invention as defined in the appended claims.

The invention claimed is:
1. A light-emitting device emitting light at an emitting wavelength, comprising a gain medium comprising an optically-active phosphosilicate glass, at least one rare-earth active ion dopant optically active at the emitting wavelength, the at least one rare-earth active ion dopant consisting of ytterbium, thulium, neodymium, an oxide thereof, or any combination thereof, said phosphosilicate glass further comprising from about 1 to 30 mol %, of phosphorus oxide.

2. The light-emitting device of claim 1, wherein the at least one active ion dopant induces a photodarkening effect in optical properties of the optically-active glass and the phosphorus oxide is present in an effective amount for reducing the photodarkening effect and maintaining a stable output power over time.

3. The light-emitting device of claim 1, wherein the phosphorus oxide is present in an amount for increasing a saturation energy of the system, thereby reducing temporal pulse deformation.

4. The light-emitting device of claim 1, wherein the phosphorus oxide is present in an amount selected for reducing non-linear effects.

5. The light-emitting device of claim 1, wherein the optically-active glass further comprises at least one co-dopant.

6. The light-emitting device of claim 5, wherein the co-dopant comprises an oxide of Al, an oxide of B, an oxide of F, an oxide of Ge, an oxide of La, an oxide of Lu, an oxide of P, an oxide of Ti, or any combination thereof.

7. The light-emitting device of claim 1, wherein the device emits light or emits and amplifies light.

8. The light-emitting device of claim 1, comprising an amplifier and wherein the amplifier comprises the gain medium.

9. The light-emitting device of claim 1, comprising a laser and wherein the laser comprises the gain medium.

10. The light-emitting device of claim 1, comprising an optical waveguide wherein the optical waveguide comprises the gain medium.

11. The light-emitting device of claim 10, wherein the optical waveguide comprises a core and at least one cladding surrounding the core.

12. The light-emitting device of claim 11, wherein the gain medium comprises the core.

13. The light-emitting device of claim 11, wherein the gain medium comprises at least one of the at least one cladding surrounding the core.

14. The light-emitting device of claim 11, wherein the gain medium comprises the core and at least one of the at least one cladding surrounding the core.

15. The light-emitting device of claim 11, wherein the core is not radially uniform.

16. The light-emitting device of claim 11, wherein the core comprises an outer region and an inner region, the outer region having a refractive index that is lower than a refractive index of the inner region.

17. The light-emitting device of claim 16, wherein the refractive index of the core changes gradually or in a stepped fashion.

18. The light-emitting device of claim 16, wherein the outer region is doped with Al, B, F, Ge, La, Lu, P, Ti, or oxides thereof, or any combination thereof.

19. The light-emitting device of claim 11, wherein the core comprises one or more undoped sub-regions.

20. The light-emitting device of claim 19, wherein the one or more undoped sub-regions comprise pure silica.

21. The light-emitting device of claim 11, wherein at least one of the at least one cladding comprises pure silica.

22. The light-emitting device of claim 11, wherein at least one of the at least one cladding comprises doped silica.

23. The light-emitting device of claim 11, wherein at least one of the at least one cladding is microstructured.

24. The light-emitting device of claim 11, wherein the optical waveguide has two or more claddings surrounding the core.

25. The light-emitting device of claim 11, wherein the optical waveguide is an optical fiber.

26. The light-emitting device of claim 11, wherein the optical waveguide is a triple-clad pedestal-design optical fiber.

27. The light-emitting device of claim 11, wherein the optical waveguide is a double-clad optical fiber, the core of the optical fiber having a circular cross-section, and the at least one cladding comprising an inner cladding having a pentagonal cross-section and surrounding the core and an outer cladding surrounding the inner cladding.

28. The light-emitting device of claim 11, wherein the optical waveguide has a tapered end for reducing splice losses.

29. An optical waveguide for use in a light-emitting device emitting light at an emitting wavelength, the optical waveguide comprising a gain medium including an optically-active phosphosilicate glass, comprising at least one rare-earth active ion dopant optically active at the emitting wavelength, the at least one rare-earth active ion dopant consisting of ytterbium, thulium, neodymium, an oxide thereof, or any combination thereof, said phosphosilicate glass further comprising from about 1 to 30 mol % of phosphorus oxide.

30. The optical waveguide of claim 29, wherein the at least one active ion dopant induces a photodarkening effect in optical properties of the optically-active glass and the phosphorus oxide is present in an effective amount for reducing the photodarkening effect.

31. The light-emitting device of claim 29, wherein the optical waveguide comprises a core and at least one cladding surrounding the core, and wherein the gain medium includes the core or at least one of the at least one cladding.

* * * * *